United States Patent
Holyoake et al.

(10) Patent No.: US 11,564,196 B2
(45) Date of Patent: Jan. 24, 2023

(54) DETERMINING PERIPHERAL DEVICE POSITION RELATIVE TO A PRIMARY DISPLAY

(71) Applicant: INTERNATIONAL BUSINESS MACHINES CORPORATION, Armonk, NY (US)

(72) Inventors: Colin Ian Holyoake, Braishfield (GB); John A. Owen, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/087,682

(22) Filed: Nov. 3, 2020

(65) Prior Publication Data

US 2022/0141792 A1 May 5, 2022

(51) Int. Cl.
*H04W 64/00* (2009.01)
*G06F 3/14* (2006.01)
(Continued)

(52) U.S. Cl.
CPC .......... *H04W 64/003* (2013.01); *G01S 5/0226* (2013.01); *G01S 5/0252* (2013.01);
(Continued)

(58) Field of Classification Search
CPC ..... H04W 64/003; H04W 4/02; G01S 5/0226; G01S 5/0252; G01S 5/0295; G06F 3/1423
See application file for complete search history.

(56) References Cited

U.S. PATENT DOCUMENTS

| 9,535,578 B2 * | 1/2017 | Underwood .......... G06F 3/1423 |
| 10,019,055 B2 | 7/2018 | Miller |

(Continued)

FOREIGN PATENT DOCUMENTS

| CN | 1941066 A | 4/2007 |
| CN | 101149673 A * | 3/2008 |

(Continued)

OTHER PUBLICATIONS

International Searching Authority, "Notification of Transmittal of the International Search Report and the Written Opinion of the International Searching Authority, or Declaration," Patent Cooperation Treaty, dated Jan. 25, 2022, 11 pages, International Application No. PCT/CN2021/124755.

(Continued)

*Primary Examiner* — Srilakshmi K Kumar
*Assistant Examiner* — Umair Ahsan
(74) *Attorney, Agent, or Firm* — Robert R. Aragona (57) ABSTRACT

A computer apparatus is provided for determining one or more peripheral device positions. A primary display of the computer apparatus may be provided with two or more signal receivers disposed at different locations in relation to the primary display and may be configured to receive signals from a signal transmitter at a peripheral device. The computer apparatus may include a processor and a memory configured to provide computer program instructions to the processor to execute a method of: determining a distance from the signal transmitter to each of the two or more signal receivers based on a strength of the received signal; using positioning determination to determine a direction and/or distance to a position of the signal transmitter from the primary display; and configuring the peripheral device based on the determined direction and/or distance.

20 Claims, 8 Drawing Sheets

(51) Int. Cl.
*G01S 5/02* (2010.01)
*G01S 11/06* (2006.01)

(52) U.S. Cl.
CPC .......... *G01S 5/02213* (2020.05); *G01S 11/06* (2013.01); *G06F 3/1423* (2013.01)

(56) References Cited

U.S. PATENT DOCUMENTS

| | | | |
|---|---|---|---|
| 2007/0273609 A1* | 11/2007 | Yamaguchi | G06F 3/1423 345/1.1 |
| 2008/0231546 A1 | 9/2008 | Li | |
| 2016/0283084 A1 | 9/2016 | Keysers | |
| 2018/0367192 A1 | 12/2018 | O'Shea | |
| 2019/0089352 A1 | 3/2019 | Hassemer | |
| 2019/0201029 A1 | 7/2019 | Shelton, IV | |
| 2019/0361694 A1* | 11/2019 | Gordon | G06F 1/3231 |
| 2021/0366436 A1* | 11/2021 | Corliss | G06F 1/1601 |

FOREIGN PATENT DOCUMENTS

| | | | |
|---|---|---|---|
| CN | 105159537 | A | 12/2015 |
| CN | 107408011 | A | 11/2017 |
| CN | 107422886 | A * | 12/2017 |
| CN | 107422886 | A | 12/2017 |
| CN | 107831901 | A | 3/2018 |
| CN | 111434049 | A | 7/2020 |
| CN | 111542887 | A | 8/2020 |
| WO | 2019086326 | A1 | 5/2019 |
| WO | 2019100989 | A1 | 5/2019 |

OTHER PUBLICATIONS

Holyoake et al., "Idetermining Peripheral Device Position Relative to a Primary Display," Application and Drawings, Filed on Oct. 19, 2021, 32 Pages, Related Patent Cooperation Treaty Patent Application Serial No. CN2021/124755.

Mell et al., "The NIST Definition of Cloud Computing", National Institute of Standards and Technology, Special Publication 800-145, Sep. 2011, 7 pages.

* cited by examiner

DETERMINING PERIPHERAL DEVICE POSITION RELATIVE TO A PRIMARY DISPLAY

BACKGROUND

The present invention relates to determining a peripheral device position relative to a primary display.

A single display of a computing device may not be sufficient for a user to display multiple applications with which they are interacting. It is known to extend a display of a computing device by adding one or more additional peripheral displays. An arrangement of the peripheral displays in relation to the primary display may be set such that the user interface of the computing device is extended. When the user interface is extended, a cursor or pointer may be moved from the primary display into a peripheral display by extension in a configured direction.

An operating system of the computing device may gather peripheral displays that are connected to the computing device, and the user may then configure the arrangement of the peripheral displays in relation to the primary display.

Some operating systems utilize hardware profiles such as "docked" and "undocked" to setup extended displays based on user profiles. The user of a computing device may configure that a regularly attached display is to the left of the primary display. The result of the hardware profile may be that the pointer can slide from one screen to the other by the user moving a pointing device a further amount past the border of the primary display into the left display.

When the user switches to another location and uses a projector for customer demonstrations, or uses any other unfamiliar display, the hardware profile may be inaccurate and needs to be reset. Similarly, the regularly attached display may be moved for some reason, thereby invalidating the hardware profile.

SUMMARY

According to an aspect of the present invention there is provided a computer apparatus for determining one or more peripheral device positions. A primary display of the computer apparatus may have two or more signal receivers disposed at different locations in relation to the primary display and may be configured to receive signals from a signal transmitter at a peripheral device. A processor and a memory may be configured to provide computer program instructions to the processor to execute a method. The method may include determining a distance of the signal transmitter from each of the two or more signal receivers based on a strength of the received signals. The method may also include using positioning determination to determine a direction and/or a distance to a position of the signal transmitter from the primary display. The method may further include configuring the peripheral device based on the determined direction and/or distance.

According to another aspect of the present invention there is provided a computer-implemented method for determining one or more peripheral device positions. The method may include receiving at two or more signal receivers disposed at different locations in relation to a primary display signals from a signal transmitter at a peripheral device. The method may also include determining a distance of the signal transmitter from each of the two or more signal receivers based on a strength of the received signals. The method may further include using position determining to determine a direction and/or a distance to a position of the signal transmitter from the primary display. The method may also include configuring the peripheral device based on the determined direction and/or distance.

According to a further aspect of the present invention there is provided a system for determining one or more peripheral device positions. A processor and a memory may be configured to provide computer program instructions to the processor to execute a function of the components. A signal processing component may receive at two or more signal receivers disposed at different locations in relation to a primary display signals from a signal transmitter at a peripheral device. A distance determining component may determine a distance of the signal transmitter from each of the two or more signal receivers based on a strength of the received signals. A position determining component may use position determination to determine a direction and/or distance to a position of the signal transmitter from the primary display. A configuration component may configure the peripheral device based on the determined direction and/or distance.

According to a further aspect of the present invention there is provided a computer program product for determining one or more peripheral device positions. A computer readable storage medium may have program instructions embodied therewith. The program instructions may be executable by a processor to cause the processor to implement a method. The method may include receiving at two or more signal receivers disposed at different locations in relation to a primary display signals from a signal transmitter at a peripheral device. The method may also include determining a position of the signal transmitter from each of the two or more signal receivers based on a strength of the received signals. The method may further include using position determining to determine a direction and/or a distance to a position of the signal transmitter from the primary display. The method may also include configuring the peripheral device based on the determined direction and/or distance.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Automatic determination of a position of one or more peripheral devices providing an output device in relation to a primary device is disclosed. A primary device may be a computing device having a user interface with which a user may interact. The user interface may be provided by a primary display of the primary device and a cursor may indicate a current position of user interaction on a user interface at the primary display.

A primary display of the primary device may be provided, for example, as the screen of a laptop computer, or a connected display of a desktop computer. A user may use one or more peripheral devices as output devices to extend the user interface. Such peripheral devices may be attached to the primary device via a physical cable or via a wireless communication. Such peripheral devices may be additional monitors or screens, projectors, or other output devices on which a cursor may be displayed.

Automatic determination of a position of a physical device may be provided by embedding or attaching two or more signal receivers at different locations in relation to the primary display. The signal receivers may be configured to receive signals form a signal transmitter at a peripheral device. The signal transmitter at the peripheral device may be attached to the peripheral device or integrated into the peripheral device. In one embodiment, the signal transmitter may be provided at the peripheral end of a cable connecting the primary device to the peripheral device.

The signal transmitter may transmit a signal that can be interpreted at the receiver to indicate a position of the signal transmitter, and therefore the peripheral device, in relation to the primary display. The position may be a direction and/or distance of the peripheral device in relation to the primary display and may be provided in a two-dimensional field or a three-dimensional field as explained below. This may be carried out by determining a distance from the signal transmitter to each signal receiver by determining a strength of the received signal. The transmitted signal may also include an identifier of the signal transmitter or the peripheral device to which the transmitted signal is attached to distinguish the transmitted signal from other received signals from other peripheral devices.

The signal transmitters may use WiFi, LiFi, or Bluetooth including Bluetooth Low Energy transmitters. In one embodiment, the signal transmitter may be a Bluetooth Low Energy (BLE) beacon that transmits a broadcast of its identifier to nearby receiver devices. BLE beacons may be based on Bluetooth low energy proximity sensing that transmits a universally unique identifier picked up by a compatible application or operating system. The identifier and several bytes sent with it can be used to determine the beacon's physical position. Ranging may provide an estimated distance from the receiving device to a beacon.

The two or more signal receivers at the primary device may use positioning determination in the form of trilateration of the determined distance to a beacon from each of the signal receivers to determine a position of the beacon. Other methods may use triangulation techniques or other methods known in the field of global positioning systems and indoor positioning systems using beacons or WiFi transmitters. Two signal receivers at the primary display may provide a coarse estimation of the peripheral device's position, whilst having three or more signal receivers at the primary display may provide finer estimation of the position.

Once a position of a beacon in relation to the primary device is determined, a type of peripheral device at the beacon can be identified from the beacon identifier. An extension to the primary display of the user interface may be configured for the peripheral device at the beacon to extend the user interface area. The configuration may enable a user to extend a range of their cursor into the display of the peripheral device in the correct orientation in relation to the primary display.

The position of a peripheral device may be based on a direction from the primary display such that a user interface extension can be provided in the correct direction. Alternatively or additionally, the position of a peripheral device may be based on a distance from the primary display and may indicate a use of the peripheral device. For example, a greater distance may indicate that a peripheral device is a projector in which case an extension of the interface may provide a mirror or presentation to the peripheral device as opposed to an interface area extension for a closer peripheral device.

If the peripheral device is moved, the beacon signal may change and a new position of the peripheral device may be determined and the user interface extension configuration may be adapted accordingly. This may provide for a dynamic adjustment of the user interface extension based on the relative physical position of the peripheral device providing an output device.

Figure 1A:
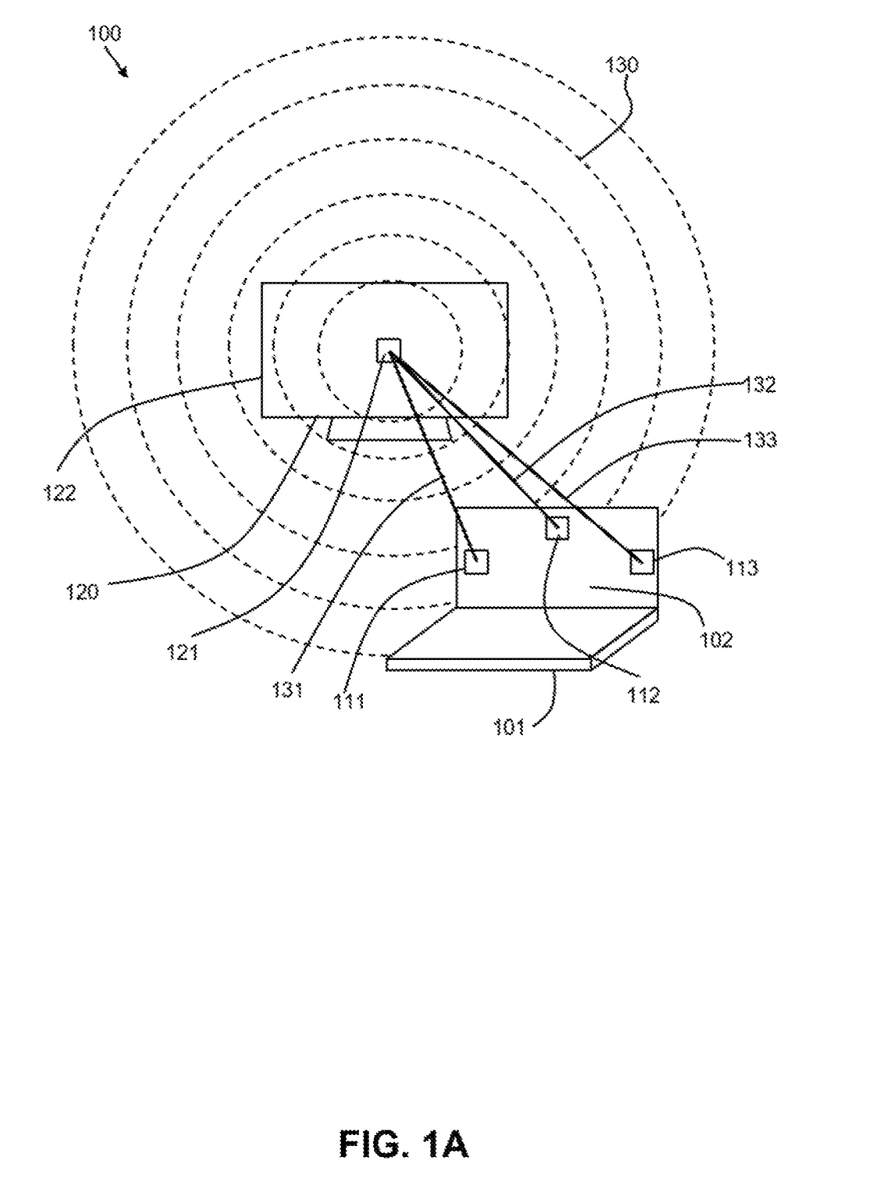
FIGS. 1A and 1B are schematic diagrams showing an example embodiment of an apparatus in accordance with the present invention.

Referring to FIG. 1A, an example embodiment of the described apparatus 100 is shown in a schematic diagram. A primary device 101 with a primary display 102 has three signal receivers 111-113 disposed at different positions in relation to the primary display 102. Three signal receivers 111-113 are shown in this example, however, a minimum of two signal receivers is needed and more than three signal receivers may be provided giving more accurate results.

A signal transmitter 121 is provided at a peripheral device 120 that transmits a wireless signal. The signal transmitter 121 may be integral to the peripheral device 120 or may be connected to the peripheral device 120, for example, at a port or as an independent attachment.

The signal 130 from the signal transmitter 121 may reach the three receivers 111-113 at the primary device 101. The strength of the signal 130 reaching each of the signal receivers 111-113 is different and a distance 131-133 of each signal receiver 111-113 from the signal transmitter 121 can be determined from the signal strength.

The signal 130 may contain identifying data, such as data identifying the peripheral device 120 and the dimensions of a display area 122 of the peripheral device 120.

Figure 1B:
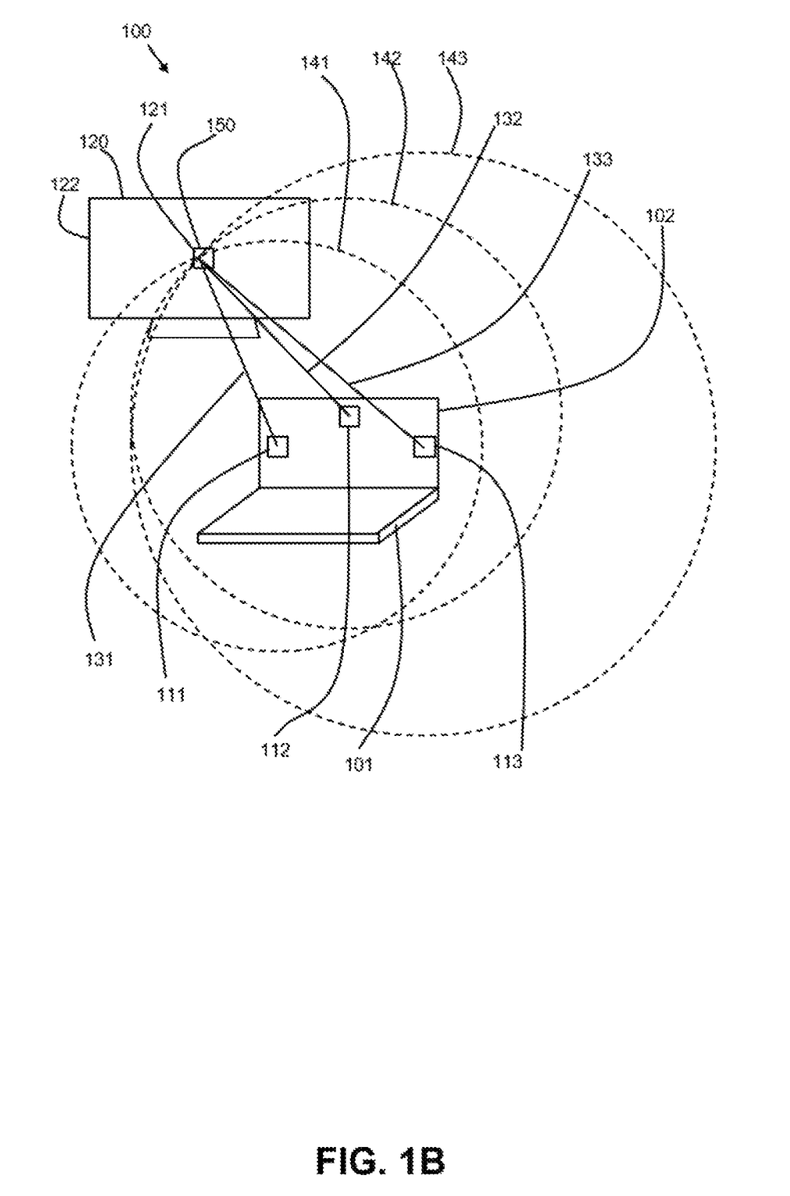

Referring to FIG. 1B, a trilateration of the signal distances 131-133 is shown by the interception 150 of circles 141-143 centered on the signal receivers 111-113 with radii of the signal distances 131-133. The interception 150 gives the position of the signal transmitter 121 at the peripheral device 120 such that an operating system or application at the primary device 101 can determine a direction for extension of a user interface to a peripheral display of the peripheral device 120.

A more basic form of positioning may be performed by simply sensing the signal 130 at the differently positioned signal receivers 111-113. For example, if signal receivers 111-113 on a left-hand side and top edge of the primary display 102 have the same value, this suggests that the peripheral device 120 transmitting the signal 130 is diagonally on the top left side of the primary display 102. As another example, if a signal receiver, such as one of the signal receivers 111-113, only on the left-hand side of the primary display 102 can see the signal 130, the peripheral display is situated only to the left of the primary device 101.

The direction may be a three-dimensional direction or a two-dimensional direction as an extension to the plane of the primary display 102. If the primary display 102 only contains two signal receivers, such as two of the signal receivers 111-113, an approximate position of the peripheral device 120 in relation to the primary display 102 may be determined (for example, left of laptop, right of laptop). A minimum of three beacons may allow for a richer experience. From the perspective of the primary display 102, this may provide a direction only of the peripheral display (for example, on the left, top right, above). This may be a two-dimensional representation.

Being able to know approximately how far the peripheral device 120 is away from the primary display 102 may provide further information and make this a three-dimensional position, (for example, top right, 3 m away). This extra distance may be used to intelligently decide what to do with the primary display 102 and the peripheral display. For example, if the peripheral device 120 is next to the primary display 102, the system can decide automatically that the user's desktop should be extended across both monitors. Whereas if the peripheral device 120 is, for example, more than one meter away, the user may be presented with the option to either mirror their display on the primary display 102 or show their desktop in presentation mode, with their presentation on the monitor and their desktop on their laptop screen.

The data received in the transmitted signal 130 may provide information to the operating system or application at the primary device 101 as to the dimensions and orientation of the peripheral display such that the extension to the user interface can be configured to accommodate these dimensions and orientation.

The information provided by the peripheral device 120 may include its size of screen (for example, 42 inch) and orientation, (for example, portrait vs landscape) which can be used by the system to decide how to share the information across the primary display 102 and peripheral display. This may be used to determine the size of fonts to display on the peripheral display and, if it is a shared desktop, the best sides of the primary display 102 and peripheral device to share the motion of the cursor as it moves from the primary display 102 to a display at the peripheral device 120. When in a presentation mode, this information may also be used to determine which device to display the presentation on, i.e., most likely the larger one.

The signal receivers 111-113 may receive signals 130 from multiple signal transmitters 121 at different peripheral devices 120 that may enable extension of the user interface of the primary device 101 to multiple peripheral displays. The data in the transmitted signal 130 may identify each of the multiple signal transmitters 121.

Figure 2:
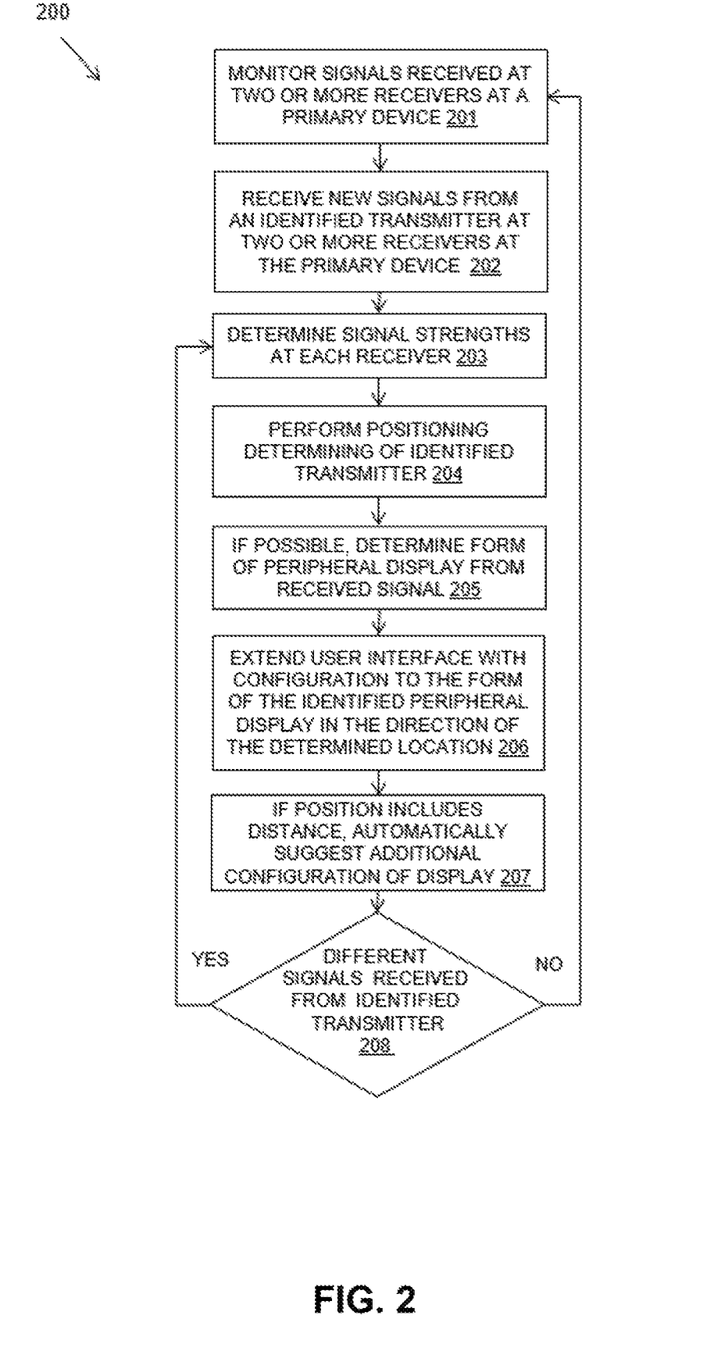
FIG. 2 is a flow diagram of an example embodiment of a method in accordance with the present invention.

Referring to FIG. 2, a flow diagram 200 shows an example embodiment of a method of determining peripheral device 120 positions relative to a primary device to configure an extension to a user interface of the primary device. The method may be carried out by a peripheral device position component as part of an operating system or an application of the primary device 101.

Signals received at two or more signal receivers of the primary device are monitored 201 for new signals. New signals are received 202 from the identified signal transmitter. The signal transmitter may be identified from identifying data within the signal.

The signal strengths received at each signal receiver are determined 203 and position determining is performed 204 to determine the position of the identified signal transmitter. The position may be a direction and/or distance of the transmitter from the signal receivers and therefore a primary display of the primary device.

If possible, the form of the peripheral display at the determined position is determined 205 from the received signal. This may be due to the transmitted signal identifying the peripheral device, or specifying the dimensions of a display in the transmitted signal.

A user interface of the primary device is extended or mirrored 206 with a configuration to the form of the identified peripheral display in a direction of the determined position.

If the determined position includes a distance of the transmitter from the primary display, the method includes automatically configuring 207 or suggesting configuration of additional aspects of the display. For example, a distance over a defined threshold may indicate that a presentation mode is being used and configuration of the display is automatically defined.

The incoming signals are monitored to determine 208 if different signals are received from an identified signal transmitter. This may be due to a movement of the peripheral device at which the signal transmitter is located. If a change is determined, the method may loop to determine 203 the new signal strengths and determine the new position 104 in order to adjust a user interface extension accordingly. If no change is determined 208 incoming signals may continue to be monitored 201 to determine if any new signals are received.

Peripheral displays may be moved in relation to the primary device and with users' preferences this may allow dynamic and automated adjustments to the peripheral device configuration. The moving of the peripheral displays may provide automated tracking between a video source and a video output with the dynamic adjustments performed for the relative physical position.

This automated configuration may remove the time required to setup a display configuration (for example, at the start of a meeting or when moving location) and may increase the general usability of using multiple displays.

The automated configuration may also be used when moving from using multiple displays to a single projector and switching back, which may reduce the manual overhead of having to reconfigure or select set hardware profiles.

For example, if the user moves, the external device moves, or even if the cable is swung from the left to the right-hand side of the laptop, the display may automatically adjust the output accordingly.

Figure 3A:
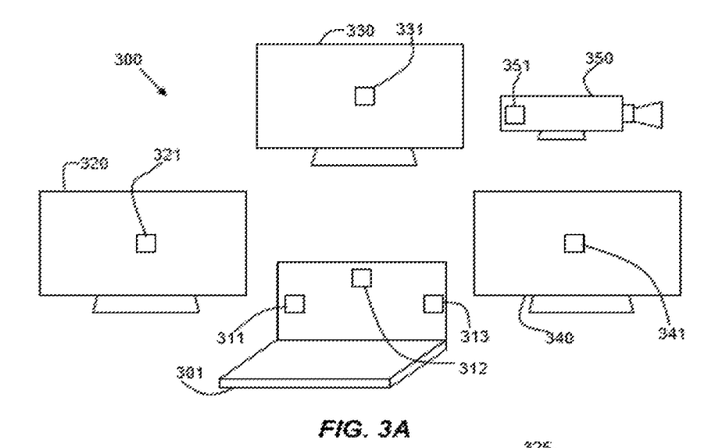
FIGS. 3A and 3B are example embodiments of implementations of the apparatus in accordance with the present invention.
Figure 3B:
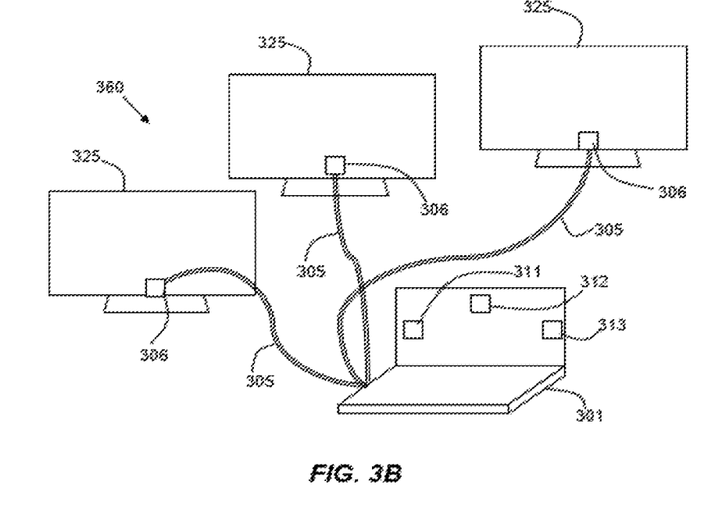

Referring to FIGS. 3A and 3B, two example implementation scenarios are shown in which the described apparatus may be used.

FIG. 3A shows a scenario 300 in which a primary device 301 includes three signal receivers 311-313 and is capable of receiving signals from and configuring an extension of its user interface to determine dynamic positions of multiple peripheral devices 320, 330, 340, 350. Each peripheral device 320, 330, 340, 350 may include a signal transmitter 321, 331, 341, 351 that indicates the position of each peripheral device 320, 330, 340, 350 to the signal receivers 311-313 of the primary device 301. In this example, the peripheral devices 320, 330, 340 may be additional screens or monitors (shown in three different positions) or a projector 350.

FIG. 3B shows a scenario 360 in which a primary device 301 includes three signal receivers 311-313 and has a connecting cable 305 with a signal transmitter 306 at its distal end. The connecting cable 305 may be attached to a peripheral device 325 such that the signal transmitter 306 is positioned at the peripheral device 325. If the peripheral device 325 is moved relative to the primary device 301 (as shown in FIG. 3B), the signal from the signal transmitter 306 at the end of the connecting cable 305 may change indicating a different position of the peripheral device 325.

Figure 4:
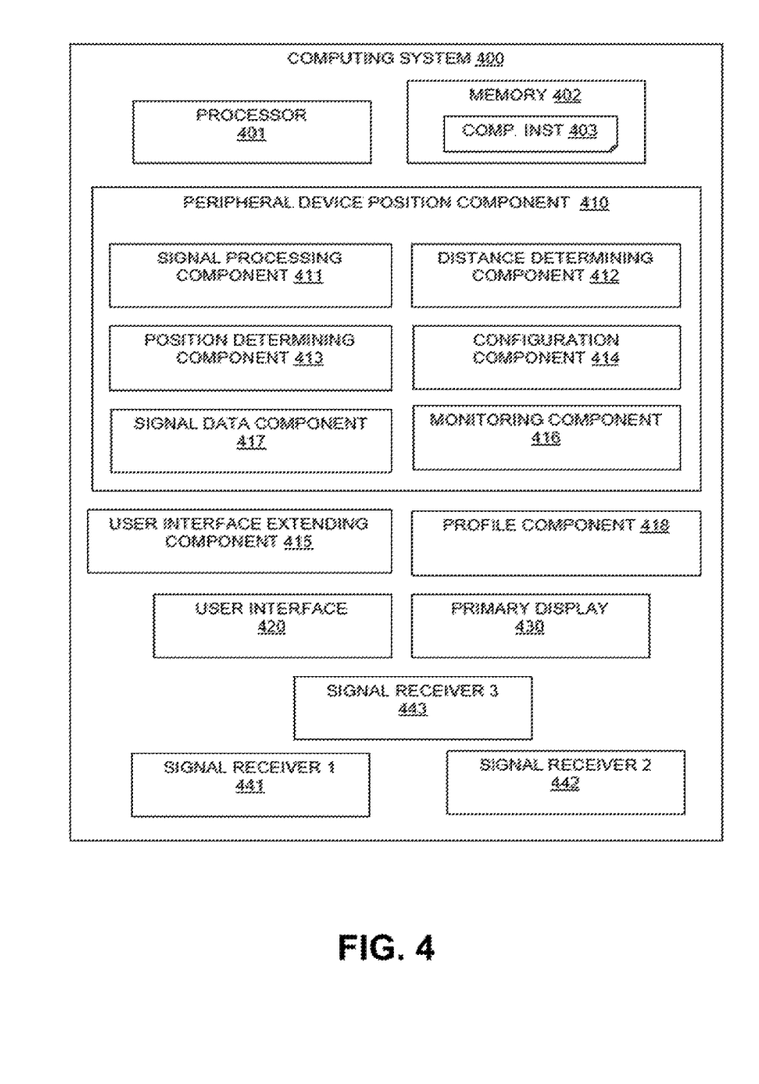
FIG. 4 is block diagram of an example embodiment of a system in accordance with the present invention.

Referring to FIG. 4, a block diagram shows a computing system 400 of a primary device. The computing system 400 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The computing system 400 may include a peripheral device position component 410 that may be part of an operating system or application executed by the computing device 400 and operating to configure a user interface 420 of the computing device 400. The computing device 400 may include a primary display 430 on which the user interface 420 is primarily executed.

The peripheral device position component 410 may include a signal processing component 411 for receiving signals from two or more signal receivers 441-443 disposed at different positions in relation to the primary display 430 of the computer system 400. The signals may be from a signal transmitter at a peripheral device.

The peripheral device position component 410 may include: a distance determining component 412 for determining a distance of the signal transmitter from each of the signal receivers 441-443 based on the strength of the received signals; and a position determining component 413 for using position determining to determine a direction and/or distance to a position of the signal transmitter from the primary display 430.

The peripheral device position component 410 may include a configuration component 414 for configuring the peripheral device based on the determined direction and/or distance. The configuration component 414 may also configure the peripheral device based on information relating to the peripheral device included in the signal.

The peripheral device position component 410 may include a signal data component 417 for receiving data in the received signal identifying a peripheral device and including information relating to the display of the peripheral device which the configuration component 414 may use.

The peripheral device position component 410 may include a monitoring component 416 for monitoring a change in received signals from a signal transmitter and dynamically determining an updated direction of the signal transmitter from the primary display 430.

The computer system 400 may include: a user interface extending component 415 for extending a user interface or a primary device to a display of the peripheral device in the determined direction; and a profile component 418 for recording the determined direction of a position of the peripheral device for a hardware profile for future use.

Figure 5:
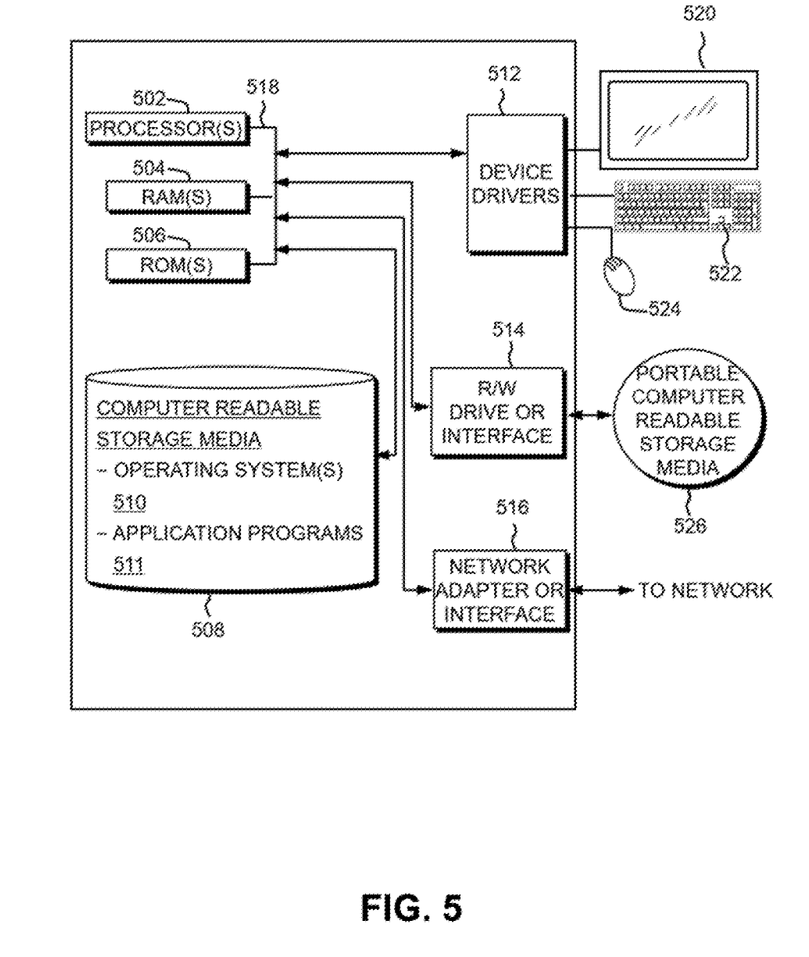
FIG. 5 is a block diagram of an embodiment of a computer system in which the present invention may be implemented.

FIG. 5 depicts a block diagram of components of the computing device 400 of FIG. 4, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 400 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the peripheral device position component 410 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 400 can also include a R/W drive or interface 514 to read from and write to one or more portable computer readable storage media 526. Application programs 511 on computing device 400 can be stored on one or more of the portable computer readable storage media 526, read via the respective R/W drive or interface 514 and loaded into the respective computer readable storage media 508.

Computing device 400 can also include a network adapter or interface 516, such as a TCP/IP adapter card or wireless communication adapter. Application programs 511 on computing device 400 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing device 400 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
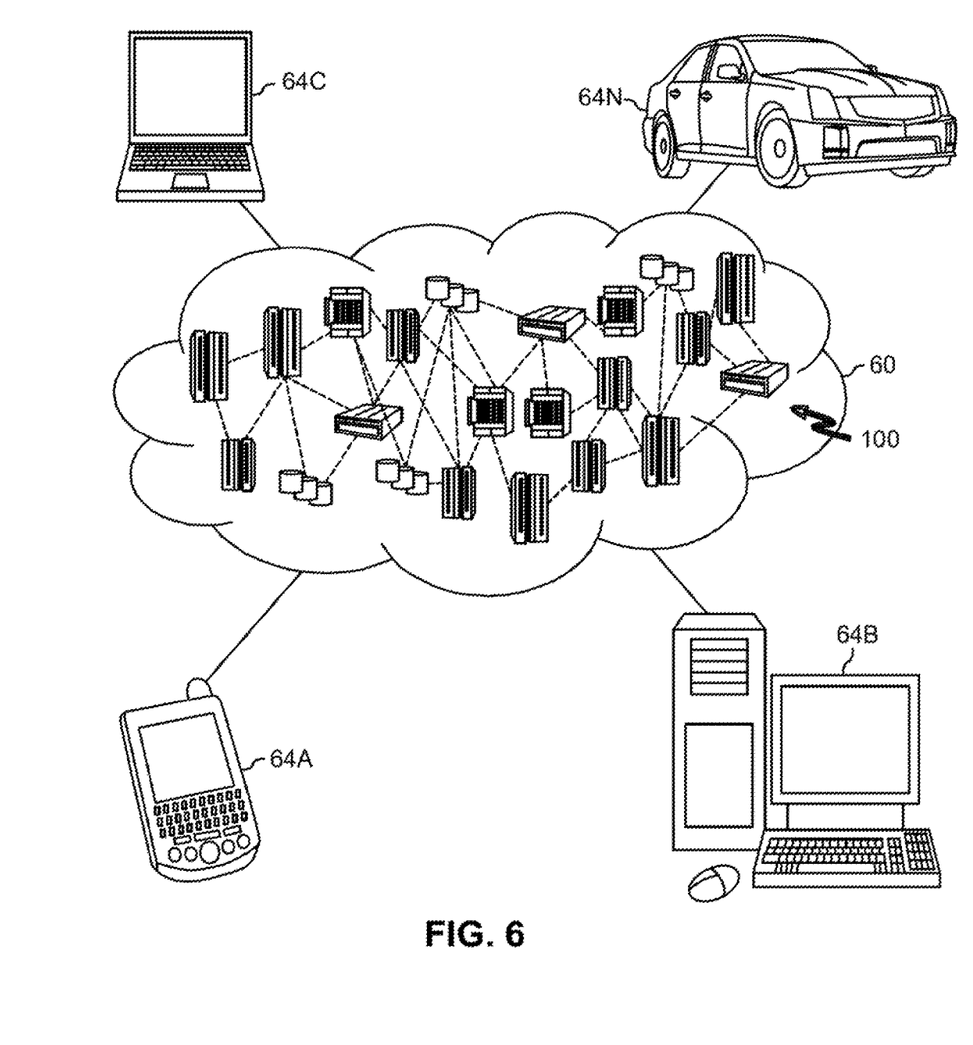
FIG. 6 depicts a cloud computing environment in accordance with the present invention.

Referring now to FIG. 6, illustrative cloud computing environment 60 is depicted. As shown, cloud computing environment 60 may comprise one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
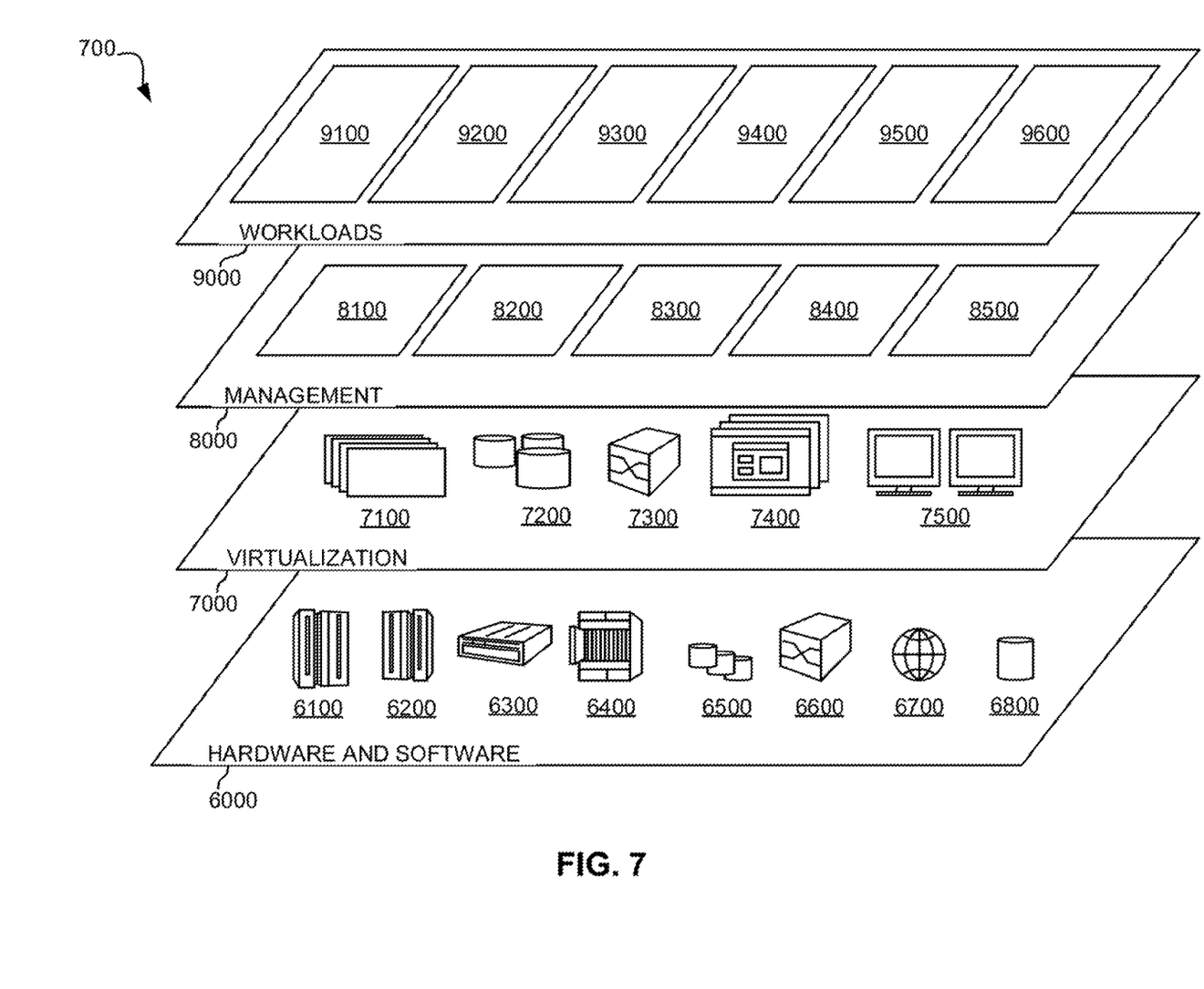
FIG. 7 depicts abstraction model layers in accordance with the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 may include hardware and software components. Examples of hardware components may include: mainframes 6100; RISC (Reduced Instruction Set Computer) architecture based servers 6200; servers 6300; blade servers 6400; storage devices 6500; and networks and networking components 6600. In some embodiments, software components may include network application server software 6700 and database software 6800.

Virtualization layer 7000 may provide an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 may provide dynamic procurement of computing resources and other resources that may be utilized to perform tasks within the cloud computing environment. Metering and Pricing 8200 may provide cost tracking as resources may be utilized within the cloud computing environment, and billing or invoicing for consumption of these resources. In one example, these resources may comprise application software licenses. Security may provide identity verification for cloud consumers and tasks, as well as protection for data and other resources. User portal 8300 may provide access to the cloud computing environment for consumers and system administrators. Service level management 8400 may provide cloud computing resource allocation and management such that required service levels may be met. Service Level Agreement (SLA) planning and fulfillment 8500 may provide pre-arrangement for, and procurement of, cloud computing resources for which a future requirement may be anticipated in accordance with an SLA.

Workloads layer 9000 may provide examples of functionality for which the cloud computing environment may be utilized. Examples of workloads and functions which may be provided from this layer may include: mapping and navigation 9100; software development and lifecycle management 9200; virtual classroom education delivery 9300; data analytics processing 9400; transaction processing 9500; and determining a peripheral device position relative to a primary display 9600. Determining a peripheral device position relative to a primary display 9600 may relate to receiving signals from a transmitter and interpreting those signals in order to discern a distance and/or direction to the primary display from the peripheral device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer apparatus for determining one or more peripheral device positions, comprising:
    a primary display of the computer apparatus having two or more signal receivers disposed at different locations in relation to the primary display and configured to receive signals from a signal transmitter at a peripheral device; and
    a processor and a memory configured to provide computer program instructions to the processor to execute a method of:
        determining a distance of the signal transmitter from each of the two or more signal receivers based on a strength of the received signals;
        using positioning determination to determine a direction and a distance to a position of the signal transmitter from the primary display; and
        configuring the peripheral device based on the determined direction and distance, wherein the configuration of the peripheral device further includes adapting displayed content on a display of the peripheral device based on whether the determined distance exceeds a pre-defined threshold distance, wherein a display mode of the peripheral device changes when the determined distance exceeds the pre-defined threshold distance.

2. The computer apparatus as claimed in claim 1, wherein a received signal within the received signals includes an identifier of the peripheral device for use in the configuring of the peripheral device.

3. The computer apparatus as claimed in claim 1, wherein the peripheral device has a display and a received signal within the received signals includes dimensions of the peripheral display.

4. The computer apparatus as claimed in claim 1, wherein the computer apparatus includes a user interface and the method further includes:
    extending the user interface to a display of the peripheral device in the determined direction.

5. The computer apparatus as claimed in claim 1, wherein the method further includes:
    monitoring a change in the received signals from the signal transmitter and dynamically determining an updated direction of the signal transmitter from the primary display.

6. The computer apparatus as claimed in claim 1, wherein the method further includes:
    recording the determined direction and/or distance of the position of the peripheral device for a hardware profile.

7. The computer apparatus as claimed in claim 1, wherein the signal receivers are configured to receive one or more of the group consisting of: WiFi signals, LiFi signals, Bluetooth signals, and Bluetooth beacon signals.

8. The computer apparatus as claimed in claim 1, wherein there are at least three signal receivers disposed at a top and opposing vertical sides of the primary display.

9. The computer apparatus as claimed in claim 4, further including configuring the extension of the user interface to the peripheral device based on the determined distance of the peripheral device from the primary display.

10. The computer apparatus as claimed in claim 1, further including a connector cable configured to connect the primary device to the peripheral device and wherein the signal transmitter is provided in a distal end of the connector cable remote from the primary device.

11. A computer-implemented method for determining one or more peripheral device positions, comprising:
receiving at two or more signal receivers disposed at different locations in relation to a primary display signals from a signal transmitter at a peripheral device;
determining a distance of the signal transmitter from each of the two or more signal receivers based on a strength of the received signals;
using position determining to determine a direction and a distance to a position of the signal transmitter from the primary display; and
configuring the peripheral device based on the determined direction and distance, wherein the configuration of the peripheral device further includes adapting displayed content on a display of the peripheral device based on whether the determined distance exceeds a pre-defined threshold distance, wherein a display mode of the peripheral device changes when the determined distance exceeds the pre-defined threshold distance.

12. The method as claimed in claim 11, further including:
extending a user interface of a primary device to a display of the peripheral device in the determined direction.

13. The method as claimed in claim 11, further including:
monitoring a change in the received signals from the signal transmitter and dynamically determining an updated direction of the signal transmitter from the primary display.

14. The method as claimed in claim 11, further including:
receiving data in the received signals identifying the peripheral device and including information relating to a display of the peripheral device; and wherein configuring the peripheral device uses the received information.

15. The method as claimed in claim 11, further including:
recording the determined direction and/or distance of the position of the peripheral device for a hardware profile for future use.

16. A system for determining one or more peripheral device positions, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by a signal processing component at two or more signal receivers disposed at different locations in relation to a primary display, signals from a signal transmitter at a peripheral device;
determining, by a distance determining component, a distance of the signal transmitter from each of the two or more signal receivers based on a strength of the received signals;
determining, by a position determining component, a direction and distance to a position of the signal transmitter from the primary display; and
configuring, by a configuration component, the peripheral device based on the determined direction and distance, wherein the configuration of the peripheral device further includes adapting displayed content on a display of the peripheral device based on whether the determined distance exceeds a pre-defined threshold distance, wherein a display mode of the peripheral device changes when the determined distance exceeds the pre-defined threshold distance.

17. The system as claimed in claim 16, further including:
extending, by a user interface extending component, a user interface of a primary device to a display of the peripheral device in the determined direction.

18. The system as claimed in claim 16, further including:
monitoring, by a monitoring component, a change in the received signals from the signal transmitter and dynamically determining an updated direction of the signal transmitter from the primary display.

19. The system as claimed in claim 16, further including:
receiving, by a signal data component, data in the received signals identifying the peripheral device and including information relating to a display of the peripheral device and wherein the configuration component uses the received information.

20. The system as claimed in claim 16, further including:
recording, by a profile component, the determined direction and/or distance of the position of the peripheral device for a hardware profile for future use.

* * * * *